United States Patent [19]

Ashley

[11] Patent Number: 5,504,418

[45] Date of Patent: Apr. 2, 1996

[54] FULL SHUNT BOOST SWITCHING VOLTAGE LIMITER FOR SOLAR PANEL ARRAY

[75] Inventor: Christopher R. Ashley, Redondo Beach, Calif.

[73] Assignee: Hughes Aircraft Company, Los Angeles, Calif.

[21] Appl. No.: 157,552

[22] Filed: Nov. 26, 1993

[51] Int. Cl.$^6$ ........................................... G05F 1/44
[52] U.S. Cl. ............................... 323/282; 323/906
[58] Field of Search ............................. 323/282, 299, 323/284, 351, 906, 222

[56] References Cited

U.S. PATENT DOCUMENTS

| | | | |
|---|---|---|---|
| 4,357,524 | 11/1982 | Apfelbeck et al. | 323/299 X |
| 4,713,742 | 12/1987 | Parsley | 323/351 X |
| 4,785,226 | 11/1988 | Fujisawa et al. | 323/906 X |
| 5,383,109 | 1/1995 | Maksimovic et al. | 323/222 |

*Primary Examiner*—Peter S. Wong
*Assistant Examiner*—Y. Jessica Han
*Attorney, Agent, or Firm*—Phyllis Y. Price; Wanda K. Denson-Low

[57] ABSTRACT

According to the present invention a bus voltage limiter is connected between a photovoltaic solar panel array and a load to limit the output voltage to a fixed dc reference voltage. The limiter includes a pulse width modulator which controls the duty cycle of a power switch from 0% to 100% to maintain a substantially constant output voltage $V_{ref}$. A coupled inductor type boost DC to DC converter includes a pair of main windings which cooperate with the duty cycle modulated power switch to provide the output voltage. An auxiliary winding provides input ripple current cancellation in conjunction with a second inductor and a dc blocking capacitor.

7 Claims, 1 Drawing Sheet

FULL SHUNT BOOST SWITCHING VOLTAGE LIMITER FOR SOLAR PANEL ARRAY

TECHNICAL FIELD

This invention relates to devices for controlling the application of power from a source to a load and more particularly to a full shunt switching voltage limiter for a solar panel array on a spacecraft.

BACKGROUND OF THE ART

A detailed description of prior art bus voltage limiters (BVL) for spacecraft solar arrays is disclosed in Ahrens et. al. U.S. Pat. No. 4,691,159, assigned to the assignee of the present invention and incorporated herein by reference. As discussed in Ahrens, conventional power regulating systems for spacecraft solar panels use shunt dissipative voltage limiters (see FIGS. 4 and 5 of Ahrens) or boost switching limiters (see FIGS. 6–9). Both use a pulse width modulation scheme to maintain a substantially constant output voltage. While the dissipative limiters dump overvoltage through a switch in shunt with the array, the boost regulator controls the voltage produced across an inductor connected in series between the solar array and the load. The voltage supplied to the load is the sum of the supply voltage and the inductor voltage. The pulse width modulator, by controlling the voltage boost provided by the inductor, regulates the output voltage. There are tradeoffs in the two approaches including the high localized heating associates with the dissipative limiters and the end-of-life power waste associated with boost limiters. The Ahrens patent is directed toward resolving these conflicting constraints by providing a regulating system in which the solar panel array is divided into a constant current part and a constant voltage part with a boost switching regulator connected to receive power from only the constant current part.

Another prior art solar panel regulator is the sequential full shunt limiter shown in FIG. 1. The solar panel control module includes a PWM controller, four shorting switches, four isolation rectifiers, a local filter capacitor C1 and a low pass filter L1C2. A complete solar panel regulator system would includes several of these modules connected together at the input of the low pass filter, each having its DC output voltage adjusted to regulate at a slightly different voltage. Each regulator then has three operating modes determined by the bus voltage (and load): all switches off, modulated drive to the switches, or all switches on. This regulator controls up to 2.5 KW of solar array power to provide a regulated output bus at 51.75± 0.75 Vdc. However, it is not without shortcomings, such as the emission of relatively high levels of electromagnetic interference (EMI). This is due to the method of solar array shunting that generates 50 volt square-waves at high frequency (40 Khz) which are present on portions of the solar array wiring external to the spacecraft. Filtering of the lines is difficult because it imparts higher electrical stresses on the shunting elements (i.e., power MOSFETs) in the BVL. More effective filtering can be implemented, where electro-magnetically sensitive programs are involved, but at a significant weight penalty. In addition to emitting high levels of EMI, the prior art BVL designs are relatively heavy and have proven to be somewhat difficult to produce. The pulse width modulation approach selected in the prior art limiter of FIG. 1 is difficult to analyze for control loop stability. During manufacture and test, the circuitry is highly sensitive to internal wiring layout and component placement. This appears to be due at least in part to the high levels of EMI that are present on the solar panel wiring inside the unit.

A coupled inductor type boost DC/DC converter power stage has been employed in other applications such as the battery discharge controller disclosed in U.S. Pat. No. 5,122,728, incorporated herein by reference. In that application the converter operates from a low impedance power source (i.e., the spacecraft battery) and supplies power to the regulated spacecraft bus. The control laws which govern that application require that the switching converter increase the duty cycle in response to an increase in load current or power. The power source voltage remains essentially constant over wide variations in load power while power source current experiences wide variations. In the bus voltage limiter application of the present invention the duty cycle decreases in response to a load increase, and the input power source voltage varies significantly over variations in load power while the input current remains essentially constant due to the nature of the photovoltaic solar array source.

SUMMARY OF THE INVENTION

In contrast to the prior art, the bus voltage limiter of the present invention utilizes a coupled-inductor boost switching dc to dc converter topology to provide full shunt voltage limiting for a spacecraft solar array. The bus voltage limiter of the present invention does not require a tapped solar panel array as in Ahrens nor separate diodes and wiring, at the limiter, for each solar array circuit as in FIG. 1. Finally, the limiter of the present invention produces very low levels of conducted and radiated electromagnetic interference.

According to the present invention a bus voltage limiter is connected between a photovoltaic solar panel array and a load to regulate the output voltage to a fixed dc reference voltage. The limiter includes a pulse width modulator which controls the duty cycle of a power switch from 0% to 100% to maintain a substantially constant output voltage $V_{out}$. A coupled inductor type boost DC to DC converter includes a pair of main windings which cooperate with the duty cycle modulated power switch to provide the regulated output voltage. An auxiliary winding of the coupled inductor provides input ripple current cancellation in conjunction with a second inductor and a dc blocking capacitor to reduce electromagnetic interference.

BRIEF DESCRIPTION OF THE DRAWINGS

A more complete understanding of the present invention may be had from the following detailed description that should be read with the drawings in which.

DETAILED DESCRIPTION OF PREFERRED EMBODIMENT

Figure 1:
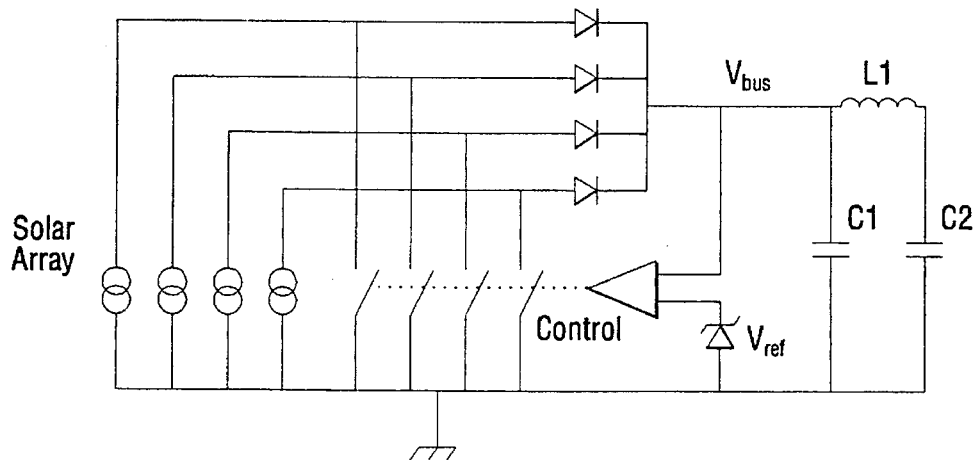
FIG. 1 is a schematic diagram of a prior art bus voltage limiter for a spacecraft solar array.
Figure 2:
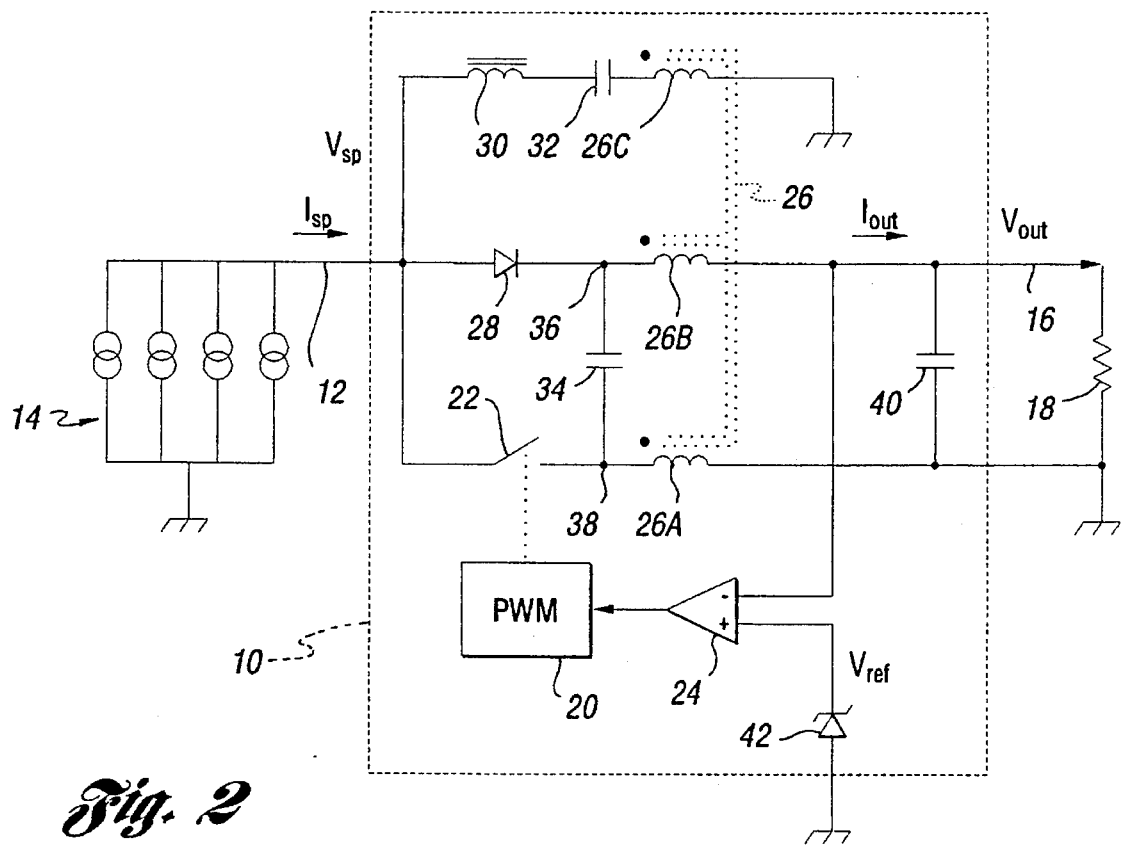
FIG. 2 is a schematic diagram of the preferred embodiment of the invention.

Referring now to FIG. 2 of the drawings, a schematic diagram of the present invention is shown. A bus voltage limiter generally designated 10 has an input power terminal 12 connected with a photovoltaic solar panel array generally designated 14 and an output power terminal 16 connected to a load generally designated 18. The limiter 10 limits the output voltage ($V_{out}$) to a fixed dc reference voltage ($V_{ref}$), while balancing the input power to the output power plus conversion loss.

The array 14 includes a plurality of individual solar cell circuits. While only four (4) cells are shown, the array may include as many as thirty two (32) circuits. Each of the cell circuits are bussed together at the panel and wired to the input of the limiter 10, thereby simplifying solar panel assembly and test as well as reducing cost as compared with the conventional sequential shunt limiter.

The limiter 10 includes a pulse width modulator 20 which controls the duty cycle of a power switch 22 from 0% to 100% in response to the output of an error amplifier 24. The switch 22 is preferably a power MOSFET device. The output of the amplifier 24 represents the error between $V_{out}$ and $V_{ref}$. A coupled inductor generally designated 26 comprises windings 26A, 26B, and 26C. One side of the winding 26A is connected to ground while the other side is connected through the switch 22 to the power terminal 12. One side of the winding 26B is connected with the output power terminal 16 while the other side is connected to the input power terminal 12 through a diode 28. The windings 26A and 26B are the main coupled inductor power windings. An auxiliary winding 26C is used to cancel input ripple current and is connected in series with an inductor 30 and a dc blocking capacitor 32 between the input power terminal 12 and ground. An energy transfer capacitor 34 is connected between a junction 36 and a junction 38. An output capacitor 40 is connected across the load 18.

The error amplifier 24 senses $V_{out}$ at one input and is connected with a zener diode 42 at the other input which establishes a reference voltage $V_{ref}$. The amplifier 24 provides an error voltage to the modulator 20 which controls the duty cycle of the power switch 22 from 0 to 100% in response to the error amplifier output. When the switch is closed, input voltage $V_{sp}$ is applied to node 38 and the voltage at node 36 equals $V_{sp}$ plus $V_{out}$. When the switch 22 is the voltage at node 36 is $V_{sp}$ minus the drop of diode 28, or essentially $V_{sp}$. Thus, the voltage at node 36 alternates between $V_{sp}$ and $V_{sp}$ plus $V_{out}$ depending on the position of switch 22. During duty cycle modulation of the switch 22 the voltage at node 36 is averaged to produce $V_{out}$. The switching frequency of the switch 22 is much higher than the resonant frequency of the circuit so the voltage across capacitors 34 and 40 is equal to $V_{out}$. The following equations describe the idealized relationships between input and output voltages and currents as a function of duty cycle and power conversion efficiency:

$$\frac{V_{out}}{V_{sp}} = \frac{1}{1-D} \quad (1)$$

$$V_{out} I_{out} = \eta [V_{sp} I_{sp}] \quad (2)$$

where "D" is the duty cycle of switch 22 which ranges from 0 to 1, and "$\eta$" is efficiency which has a nominal value of 95%.

The solar array output $I_{sp}$ is essentially a constant current. Thus, rearrangement of the terms in (1) and (2) yields:

$$D = 1 - \frac{I_{out}}{\eta I_{sp}} \quad (3)$$

In order to accommodate an output current range which includes zero amperes, the limiter must be capable of operating at a duty cycle of up to 100%. With a duty cycle of 100%, referred to as the "saturated" operating mode, all of the solar array current flows through the switch 22 and the lower winding 26A of the coupled inductor 26. The solar array 14 is completely shunted and no current reaches the limiter output. As output current demand increases from zero, duty cycle must decrease from 100% to maintain a constant output voltage. In this "active" operating mode, output voltage is regulated by controlling the duty cycle of switch 22 to satisfy the relationships as defined in equations (1) and (3). 10 In the active operating mode, the third winding 26C on the coupled-inductor provides input ripple current cancellation in conjunction with a second inductor 30 and a dc blocking capacitor 32. During active mode the current created in winding 30 is equal and opposite to the magnetizing currents in 26A(when it is energized) and 26B(when it is energized). This cancels the input ripple currents caused by the switching so that $I_{sp}$ is essentially a direct current, thereby producing very low levels of conducted and radiated electromagnetic interference. When the duty cycle reaches 0%, the limiter assumes a "passive" operating mode, wherein the switch 22 remains off and all of the solar array current flows through the diode 28 and the upper winding 26B of the coupled-inductor, and is fed to the load 18. The input and output relationship is the conventional boost as in Equation 1. However, the solar array presents a current limited input. Thus, the function of the modulator 20 is to collapse the voltage at the input depending on the output current demand, so that the duty cycle ratio balances the input power to the output power plus conversion loss.

While the forms of the invention herein disclosed are presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

What is claimed is:

1. A bus voltafie limiter connected between a spacecraft power source, which power source provides a substantially constant current and variable voltage, and a load, said bus voltage limiter connecting said power source to said load and comprising:

a coupled inductor having a plurality of windings including at least first and second windings, a switch adapted to be placed in a first state to conduct all current from said power source to said first winding and adapted to be placed in a second state wherein current from said power source flows through said second winding to said load, whereby the output voltage of said power source is varied to maintain output power to said load substantially equal to input power from said power source.

2. The invention defined in claim 1 wherein said coupled inductor further includes a third winding connected with said source through a second inductor and a dc blocking capacitor and is effective to produce cancellation of input ripple current resulting from operation of said switch.

3. The invention defined in claim 1 wherein said limiter includes a modulator for controlling the duty cycle of said switch by decreasing the duty cycle in response to increases in load current and by increasing the duty cycle of said switch in response to decreases in load current, to maintain a substantially constant output voltage at said load.

4. The invention defined in claim 1 wherein said power source comprises an array of solar panels.

5. The invention defined in claim 4 wherein said switch is a power MOSFET device.

6. A bus voltage limiter adapted to be connected between a load and a spacecraft power source, which power source is comprised of an array of solar panels providing a substantially constant current and a variable voltage, said limiter comprising:

power switch means connected with said power source, a coupled inductor having first and second windings, each winding having first and second ends, an output capacitor connected across said load and to said first end of said first and second windings, an energy transfer capacitor connected to said second end of said first and second windings, said power switch means adapted to connect said second end of said first winding to said source, a diode connecting said second end of said second winding to said source, modulator means for decreasing the duty cycle of said switch means in response to increases in load current and for increasing the duty cycle of said switch means in response to decreases in load current, to maintain a substantially constant output voltage at said load.

7. The invention defined in claim 6 wherein said coupled inductor further includes a third winding connected with said array of solar panels through a second inductor and a dc blocking capacitor and is effective to produce cancellation of input ripple current resulting from operation of said power switch.

\* \* \* \* \*